(12) United States Patent
Steele

(10) Patent No.: US 7,236,980 B2
(45) Date of Patent: Jun. 26, 2007

(54) UNICODE NORMALIZATION

(75) Inventor: Shawn Steele, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 460 days.

(21) Appl. No.: 10/375,004

(22) Filed: Feb. 28, 2003

(65) Prior Publication Data

US 2004/0177077 A1 Sep. 9, 2004

(51) Int. Cl.
*G06F 17/30* (2006.01)
(52) U.S. Cl. .......................................... 707/101; 707/2
(58) Field of Classification Search ............... 707/2–7, 707/100, 101
See application file for complete search history.

(56) References Cited

U.S. PATENT DOCUMENTS

| | | | | |
|---|---|---|---|---|
| 5,526,477 A | * | 6/1996 | McConnell et al. | 345/467 |
| 5,793,381 A | * | 8/1998 | Edberg et al. | 345/467 |
| 6,147,628 A | * | 11/2000 | Dyche et al. | 341/60 |
| 6,204,782 B1 | * | 3/2001 | Gonzalez et al. | 341/90 |
| 6,438,516 B1 | * | 8/2002 | Davis | 704/8 |
| 6,883,007 B2 | * | 4/2005 | Atkin | 707/101 |
| 2004/0006569 A1 | * | 1/2004 | Carlin et al. | 707/101 |

OTHER PUBLICATIONS

Mark Davis and Martin Durst, Unicode Technical Reports, Unicode Standard Annex #15, Unicode Normalization Forms, Version Unicode 3.2.0, Mar. 26, 2002.*

Davis, Mark, et al., Unicode Technical Reports, Unicode Standard Annex #15, Unicode Normalization Forms, Version Unicode 3.2.0, Mar. 26, 2002.

* cited by examiner

*Primary Examiner*—Cheryl Lewis
(74) *Attorney, Agent, or Firm*—Banner & Witcoff, Ltd.

(57) ABSTRACT

A system and process for achieving faster Unicode normalizations is described. Various approaches are highlighted that when used alone or in combination eliminate a number of time consuming routines of conventional normalization approaches. Some of the approaches include late normalization, avoiding second table lookups, compressed classes and use of flags, assigning classes to base characters, complicated characters, and flags.

16 Claims, 12 Drawing Sheets

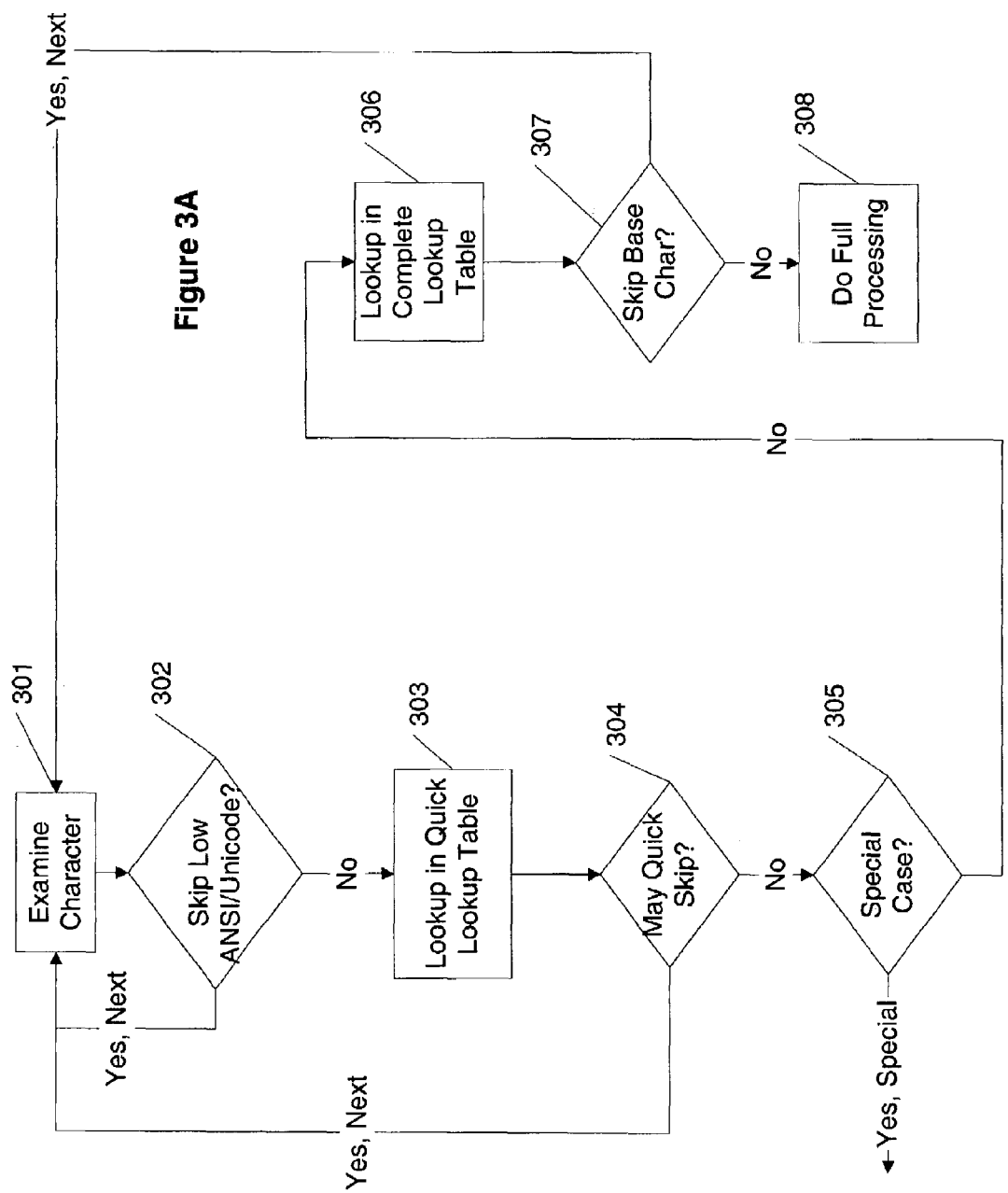

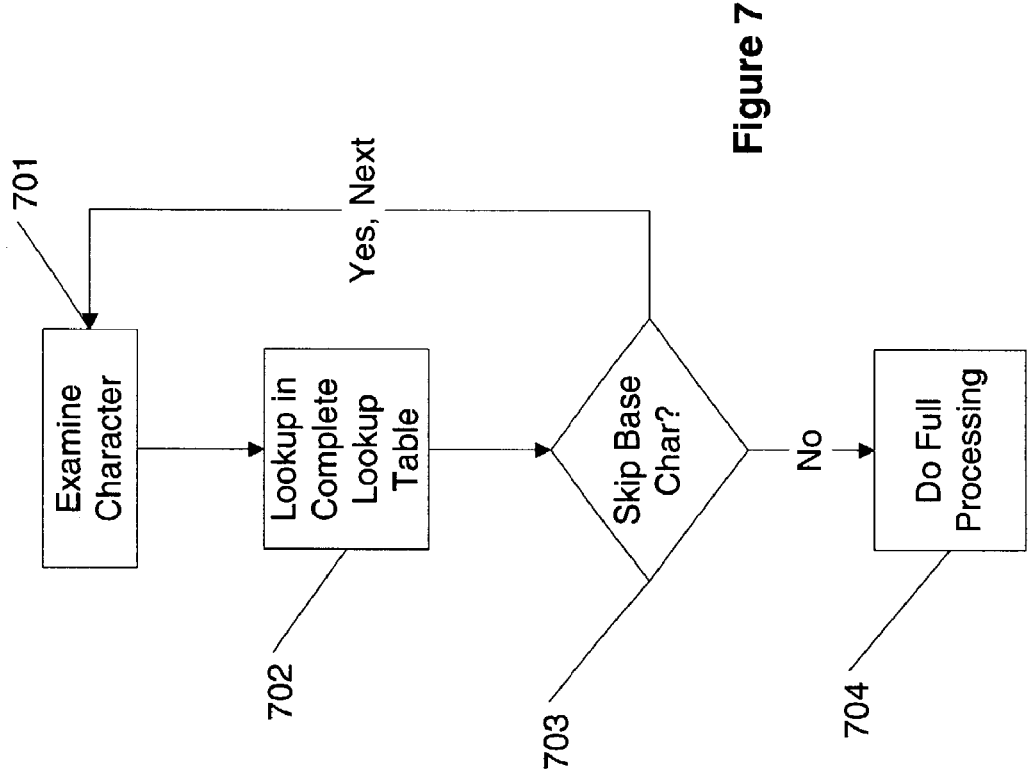

UNICODE NORMALIZATION

FIELD OF INVENTION

Aspects of the present invention are directed to computer-storable information. More particularly, aspects of the present invention are directed to normalizing Unicode.

RELATED ART

Unicode is an attempt to provide a universal text encoding standard. Through the use of Unicode, nearly all displayable characters may be encoded and easily referenced. Unicode uses 16 bits to represent characters. The characters are grouped into classes to help organize the order in which characters or the glyphs that make up characters are presented.

There are four accepted normalization forms:
D Canonical decomposition
C Canonical decomposition, followed by canonical composition
KD Compatibility decomposition
KC Compatibility decomposition, followed by canonical composition Normalization is used to order the contents of a character in order to aid comparing and sorting operations. Normalization is important because Unicode allows multiple methods of encoding identical strings. For example, a capital A with a ring on top can be represented in Unicode in a variety of ways. First, it can be represented as a combined form of a capital A and a ring "Å". Second, it can be represented in a decomposed form of a capital A and a ring "A"+"°". To an end user, the symbol denoted by each of these three examples is the same "Å". Accordingly, while a person may expect to see a sorted list of words containing "Å" to be sorted one way, the actual sorting may vary (without normalization) because of how the various angstrom, combined and decomposed forms, are treated by a sorting engine. Normalization addresses these issues by modifying the representations of the various terms to place them in an accepted form (D, C, KD, and KC). It is appreciated that other normalized forms may be accepted over time.

The problem with normalization is that it is a resource consuming process. For example, FIG. 8 shows the standard three-part normalization process (from the Unicode Consortium). In step 801, a character is decomposed into its combinable characters. In step 802, the characters are sorted. In step 803, the sorted characters are recombined.

FIG. 9 shows the decomposing process. In step 901, a character is examined. In step 902, the system determines if the character may be decomposed into one or more characters. If yes, then the system replaces the character from step 901 with the combinable characters that form it in step 904. Then the system steps to the next character in step 903. If no in step 902, then the system proceeds to step 903.

FIG. 10 shows a conventional sorting procedure. In step 1001, the system examines a character. In step 1002, the system determines if the character is a base character. If yes, then system moves to the next character in step 1003. If not a base character from step 1002, then the system finds following characters prior to the next base character in step 1004. Next, the system determines in step 1005 if the current character is a higher class than any following character prior to the next base character. If no, then the system moves to the next character in step 1003. If yes, the system swaps the characters in step 1006 and then moves to the next character in step 1003.

FIG. 11 shows a conventional normalization process in which every character in a decomposed and ordered character string is examined to determine if it can be paired with the next following character. In step 1101, a character is examined. In step 1102, the next character is examined. In step 1103, the system determines whether the following character is a base character. If yes, then the system checks in step 1107 if the base character (from step 1101) and the following character (from step 1102) are combinable. If no, the system moves to the next base character in step 1108 then back to step 1101. If yes in step 1107, the system then performs a full normalization in step 1105.

If no in step 1103, the system checks in step 1104 to see if the base character from step 1101 and the following character from step 1102 are combinable. If yes, the system moves to step 1105. If no, then the system moves to the next following character in step 1106 then back to step 1102. This way, the system attempts to combine non-base characters with their preceding base character.

Unicode groups glyphs by class. Glyphs from a lower class are normalized to occur before glyphs from a higher class. To determine the class of a glyph, normalization commonly uses two sets of tables for looking up values. Using a single table with all values is considered unworkable because of the number of possible glyphs in Unicode. Unicode uses 16 bits to specify each glyph. A table with $2^{16}$ possible values is cumbersome to use. Accordingly, conventional systems use a two-table look up configuration as shown in FIG. 9. During normalization process 901, the Unicode value for a glyph is checked against a first lookup table 902. In table 902, the Unicode sets are grouped into blocks of 128 code sets. Generally, the range of each of the blocks as shown in the first table look up as follows: 0-127, 128-255, . . . The second table lookup breaks down the each set of values into their respective glyphs. So table 903 includes the glyphs 0-127, table 904 includes the glyphs 128-255, and so on for the remaining tables (905, 906 and the like). The problem with the second table look up is that the second table look up consumes resources and takes time.

An improved system is needed that does not consume as much resources and/or time than the conventional normalization procedures described above.

SUMMARY

Aspects of the present invention provide solutions to at least one of the issues mentioned above, thereby minimizing the time required for most Unicode normalization operations. Aspects of the present invention include late normalization of characters, avoiding a second table lookup, the use of flags to speed normalization, assigning base characters to specific classes, and handling complicated situations. Through the use of one or more of these techniques, an improved normalization process may be realized.

BRIEF DESCRIPTION OF DRAWINGS

Aspects of the invention are shown in greater detail in the attached drawings and accompanying description.

FIGS. 3A and 3B show a process for increasing the efficiency of Unicode normalization in accordance with embodiments of the present invention.

FIG. 7 shows a process for skipping base characters in accordance with embodiments of the present invention.

DETAILED DESCRIPTION OF DRAWINGS

Figure 1:
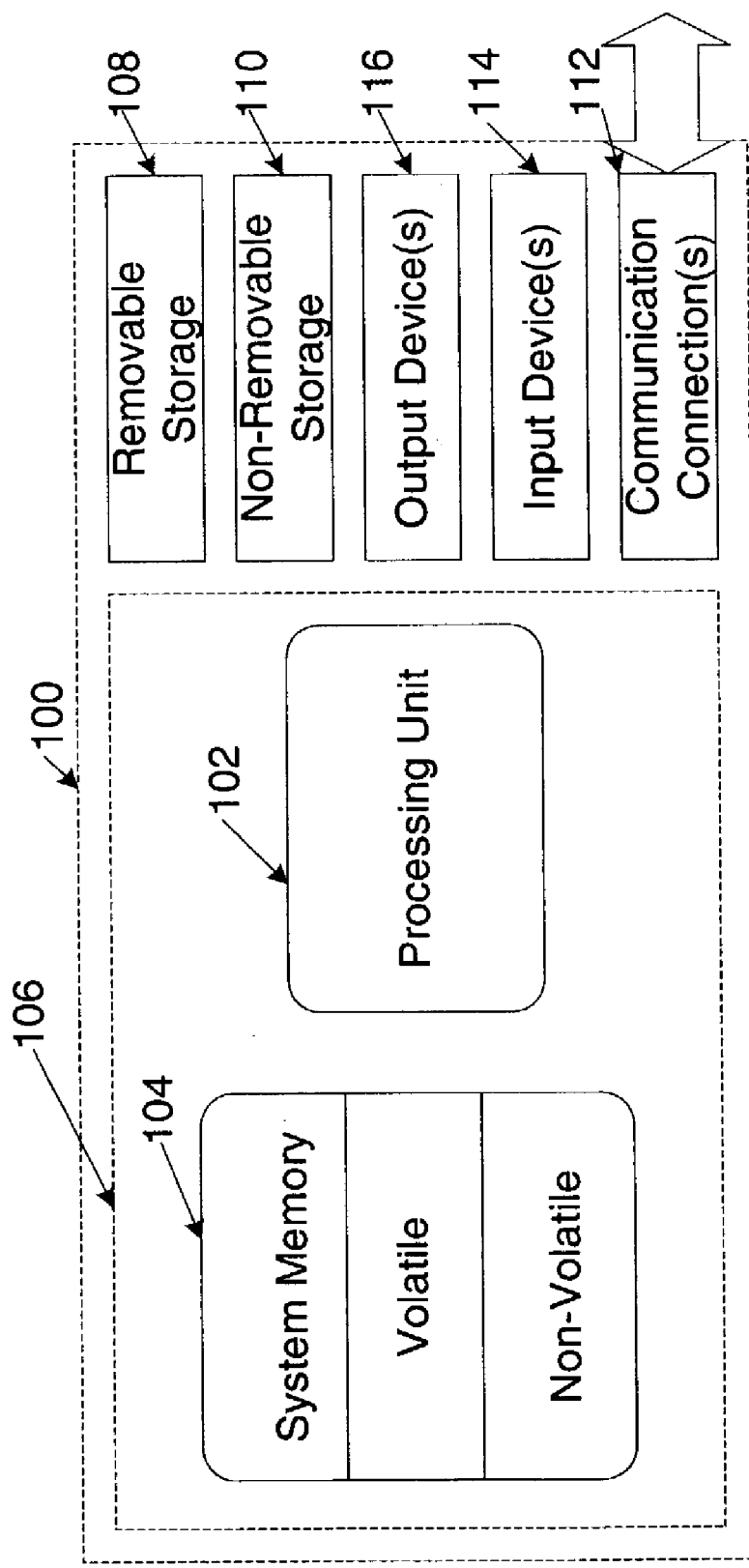
FIG. 1 shows a general-purpose computer that may support one or more aspects of the present invention.

Aspects of the present invention relate to a process for efficiently normalizing Unicode strings. The following disclosure relates to a variety of processes that may be used alone or in combination. So as to assist the reader, the following is arranged into the following sections: Unicode normalization, general-purpose computing environment, faster normalization, late normalization, avoid second table lookup, compressed classes and use of flags, assigning classes to base characters, complicated characters, and flags.

Unicode Normalization

Normalization provides an ordered form of Unicode for various uses. For example, Unicode normalization is useful to databases that generate hash and index values, to file systems for file names, for security purposes to avoid alternative inaccurate or insecure spellings, and for other similar operations. In addition to the practical uses for normalization (and because of them), Normalization has become an important feature to developers and users who need to perform the functions described above and others.

Strings containing letters (such as (Ö) can be represented in several ways in Unicode. For Ö, for example, the representation could be a single "Ö" character, or it could be "O"+ "" as two characters. The Unicode Consortium (as known in the art) suggests that each string be decomposed to its "O"+"" form and then recomposed to the "Ö" character. If other characters are added to "Ö" such as "" or "ʟ", one needs to determine the order in which the characters should be provided and or recombined. This determination is the normalization process having the four forms described above. Aspects of the present invention relate to normalizing strings in a more efficient manor.

General-Purpose Computing Environment

Aspects of the present invention are suitable for use in a distributed computing system environment. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

Aspects of the invention will be described in the general context of computer-executable instructions, such as program modules, that are executed by a processing device, including, but not limited to a personal computer. Generally, program modules include routines, programs, objects, components, data structures, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

With reference to FIG. 1, an illustrative system for implementing the invention includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 may also have input device(s) 114 such as keyboard, mouse, pen, voice input device, touch input device, etc. Output device(s) 116 such as a display, speakers, printer, etc. may also be included. All these devices are well know in the art and need not be discussed at length here.

Figure 2:
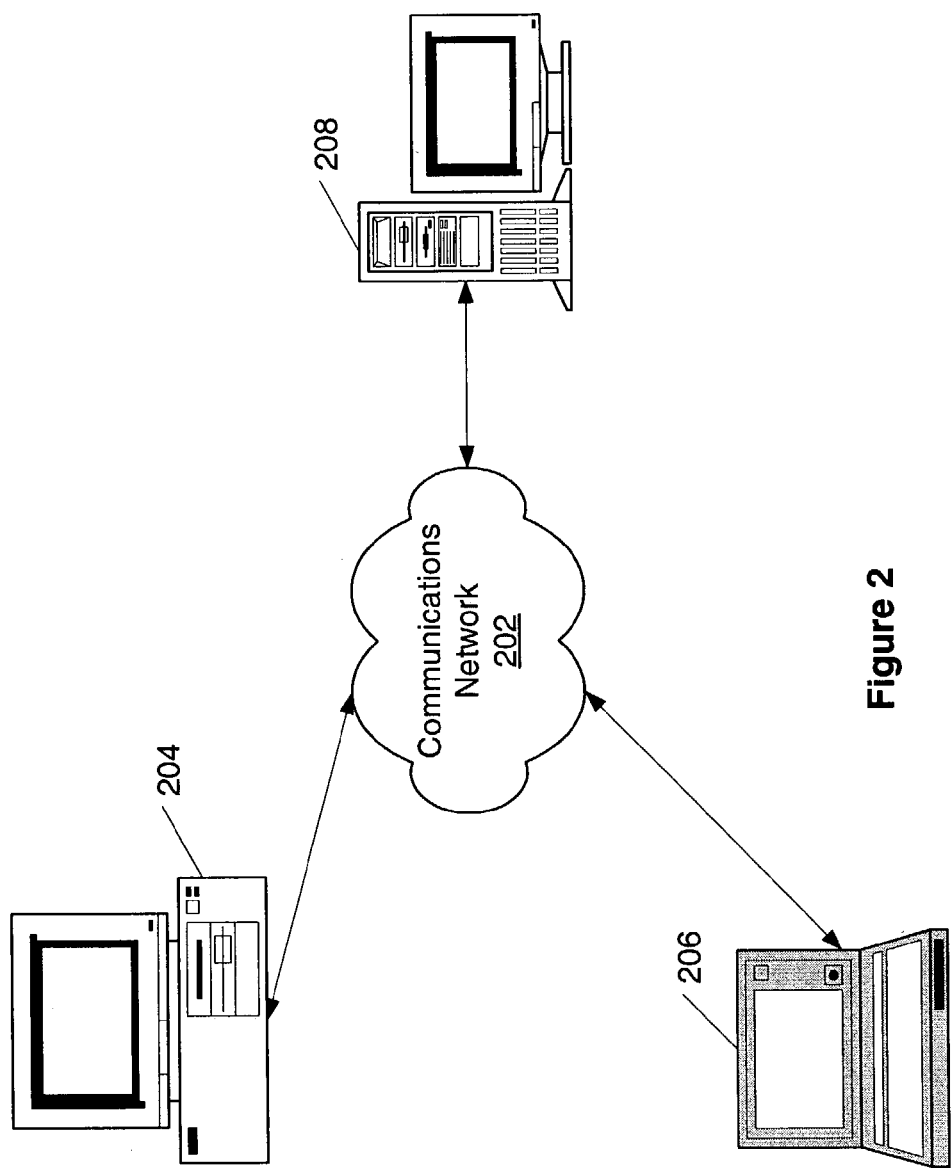
FIG. 2 shows a network diagram linking multiple computers that may be used in combination with the present invention.

FIG. 2 illustrates an example of a suitable distributed computing system 200 operating environment in which the invention may be implemented. Distributed computing system 200 is only one example of a suitable operating environment and is not intended to suggest any limitation as to the scope of use or functionality of the invention. System 200 is shown as including a communications network 201. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as the Microsoft Network or America Online's Network. Systems may also include more than one communication network, such as a LAN coupled to the Internet Computer device 202, computer device 203 and computer device 204 may be coupled to communications network 201 through communication devices. Network interfaces or adapters may be used to connect computer devices 202, 203 and 204 to a LAN. When communications network 201 includes a WAN, modems or other means for establishing a communications over WANs may be utilized. Computer devices 202, 203 and 204 may communicate with one another via communication network 201 in ways that are well known in the art. The existence of any of various well-known protocols, such as TCP/IP, Ethernet, FTP, HTTP and the like, is presumed. Computers devices 202, 203 and 204 may exchange content, applications, messages and other objects via communications network 201.

Faster Normalization

Figure 3B:
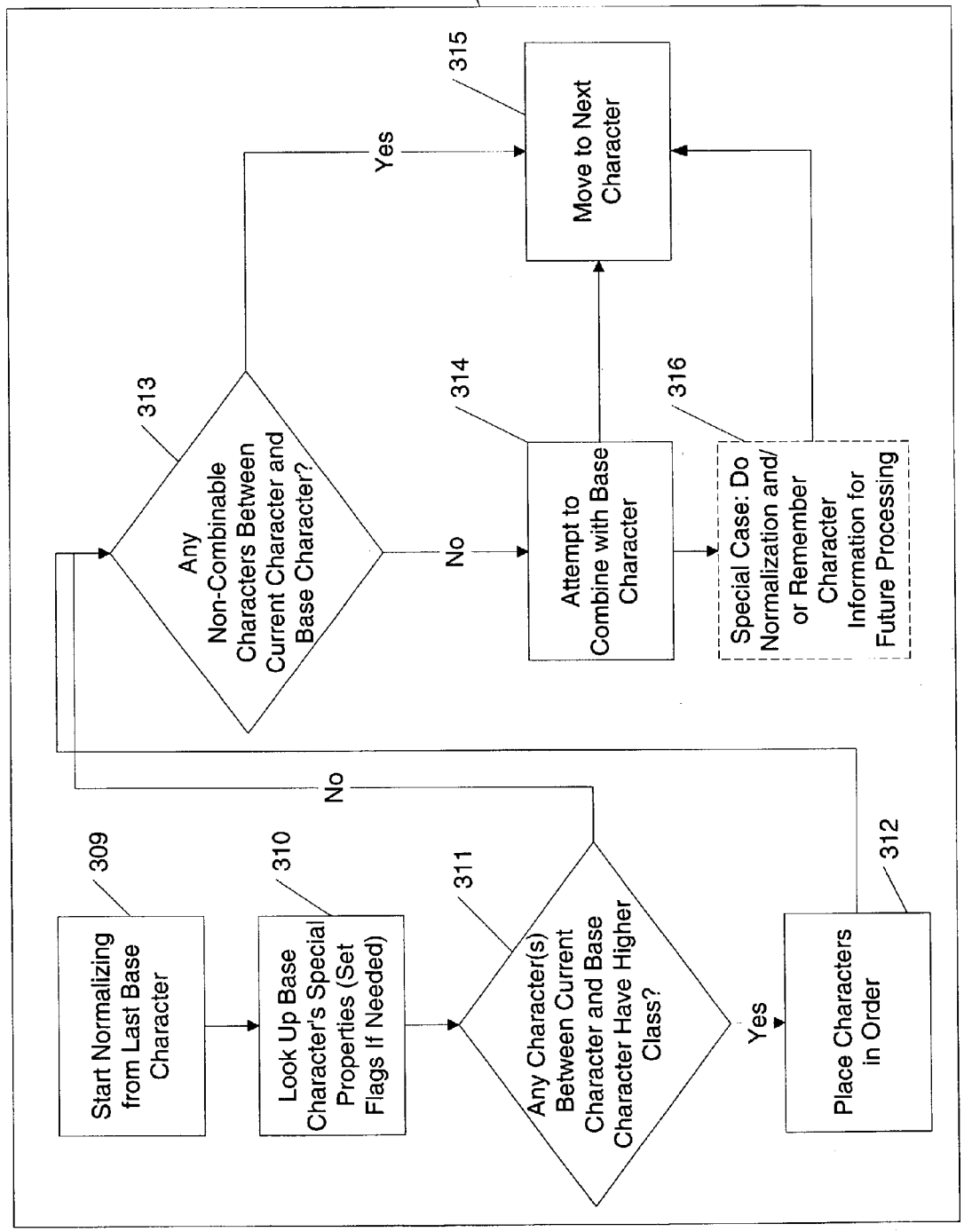

Aspects of the present invention relate to a variety of processes for increasing the efficiency of the normalization process. Each process is described below. These processes may be used separately or combined in various degrees to increase the speed of the normalization process. The processes include late normalization, avoiding second table lookup, compressed classes and the use of flags, assigning classes to base characters, complicated characters, start character classes, and compressed class ranges. FIGS. 3A and 3B shows an illustration of a process that combines the various processes together. To help the reader, the following describes the various processes then combines them in to FIGS. 3A and 3B.

Late Normalization

One aspect of the present invention uses late normalization. Instead of examining every character and every following character to see if the two may be combined, late normalization checks a character to determine if it is a non-base (or non-prime) character as is known in the art and, if so, checks to see if it is combinable with the previous character. This provides the advantage of not attempting to change a character until it is clear that it may need to change. For example, for the two characters of an "A" followed by a """, no attempt is made to normalize "A" until discovering the """. The process then steps back to examine the previous character to determine if it may be combined with the character suggesting combinability (in this case, checking the "A" after encountering the """. In many cases, the "A" would never need further attention. This provides the benefit of not attempting to check every character with every other juxtaposed character, thus saving time.

The characters that are skipped may vary by normalization form. For normalization form C, the characters that may be skipped includes all characters less than 0x300 hexadecimal. This includes all characters typically used in English and other "western" languages. For form D, one may use <0x100 hexadecimal. For forms KC and KD, one may use <0xA0 hexadecimal. Late normalization in some cases prevents the need for the second table lookup to see if characters may be combined, thus providing timesavings.

Avoid Second Table Lookup

Figure 9:
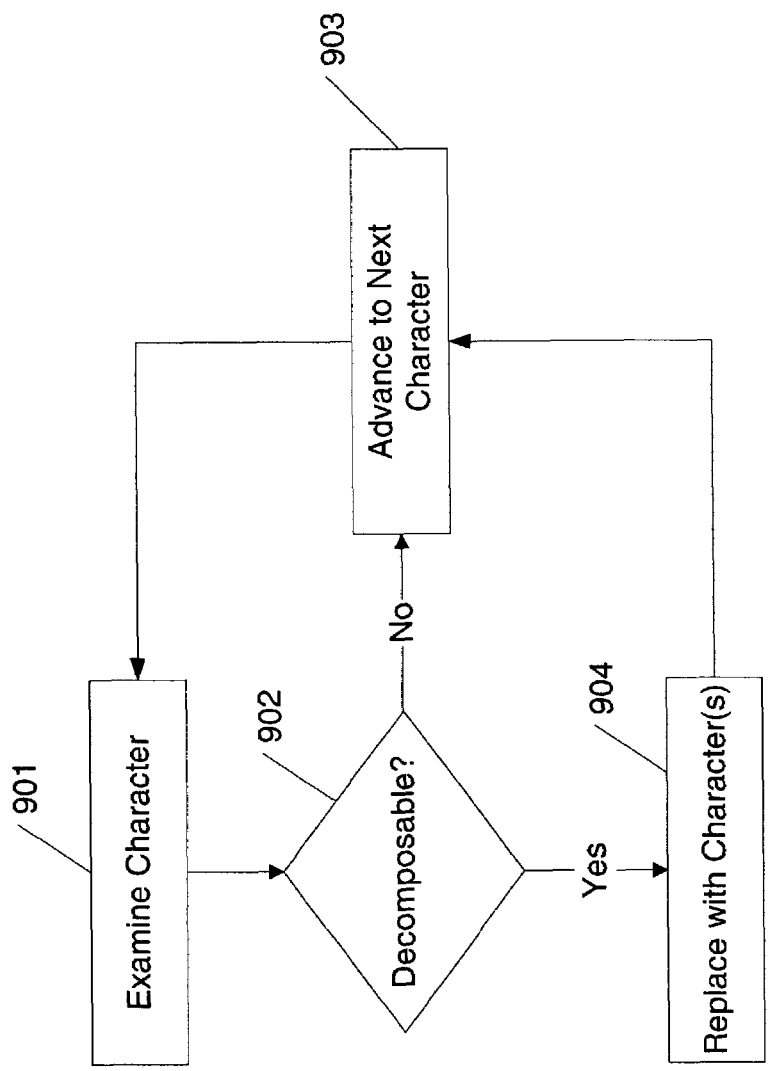
FIG. 9 shows a conventional decomposition process.
Figure 8:
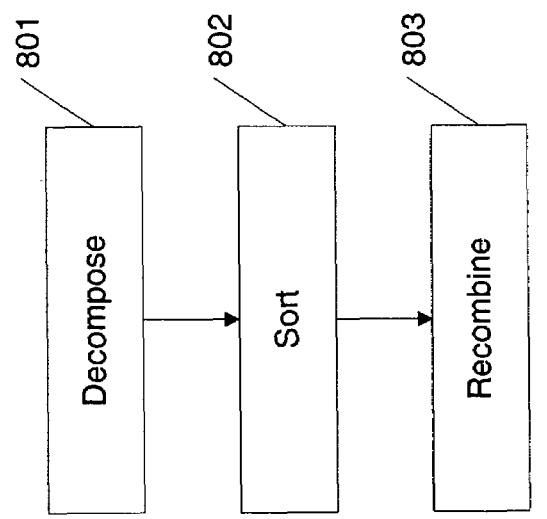
FIG. 8 shows a conventional normalization process.
Figure 10:
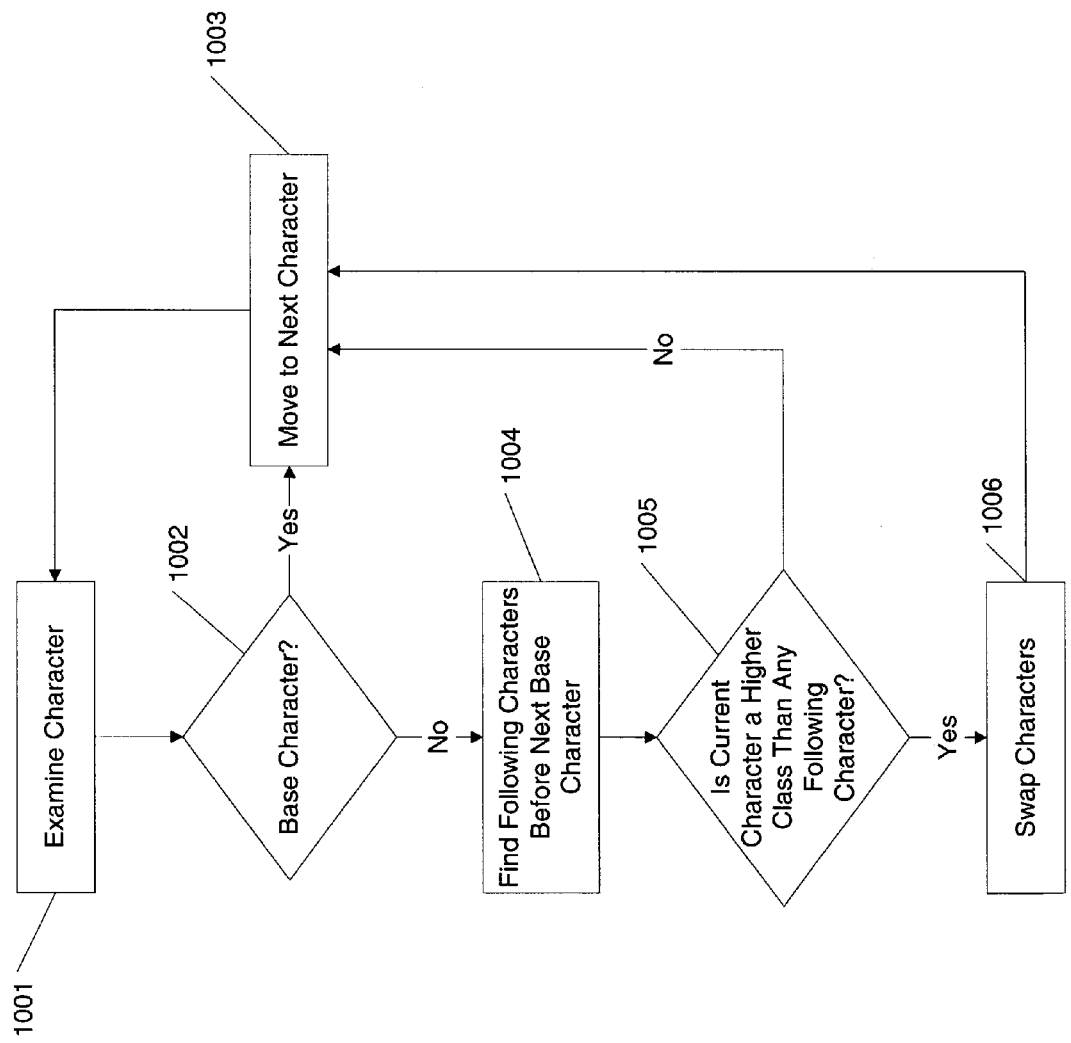
FIG. 10 shows a conventional ordering process.
Figure 11:
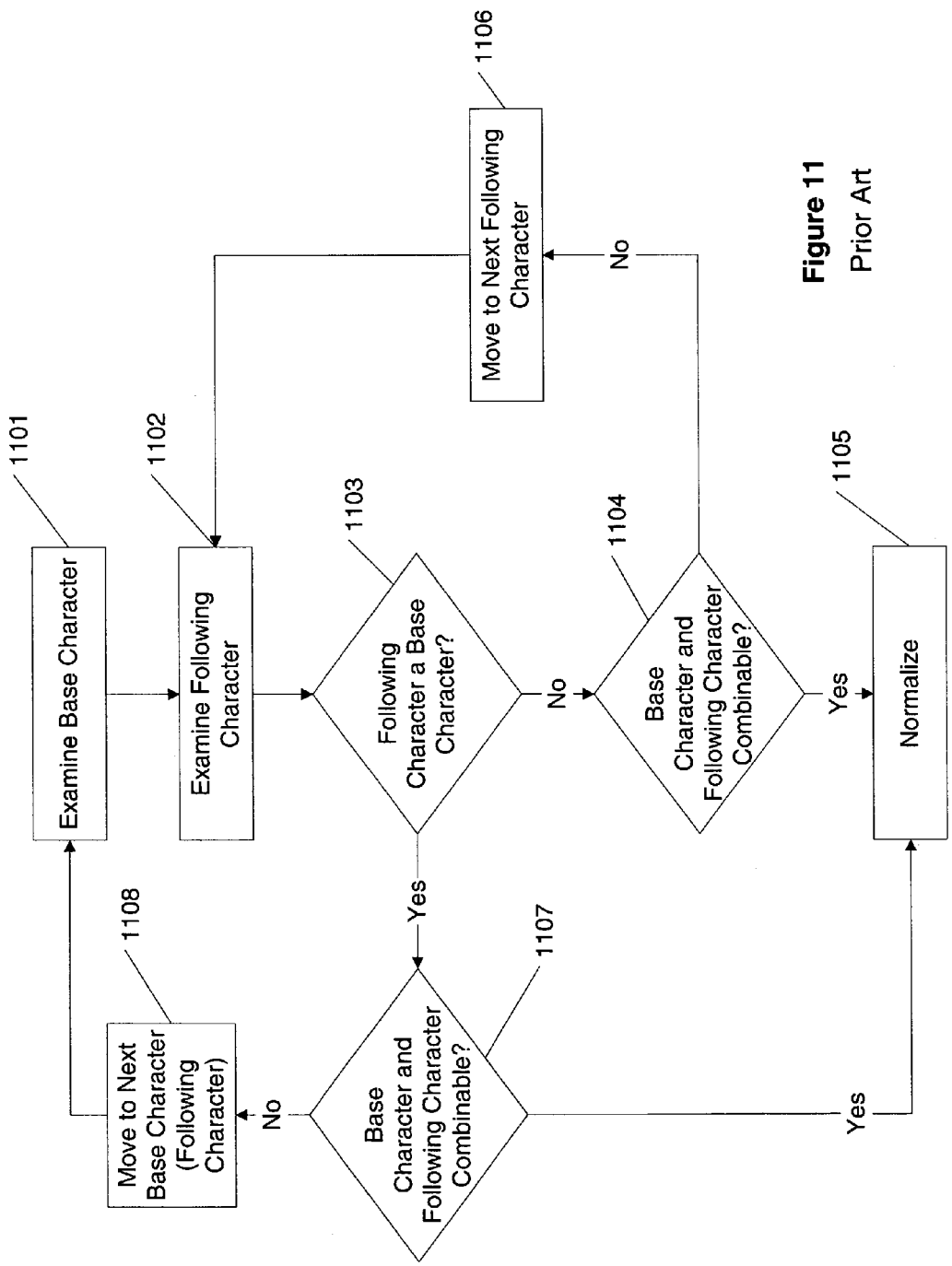
FIG. 11 shows a conventional process for determining whether two characters should be normalized or combined.
Figure 12:
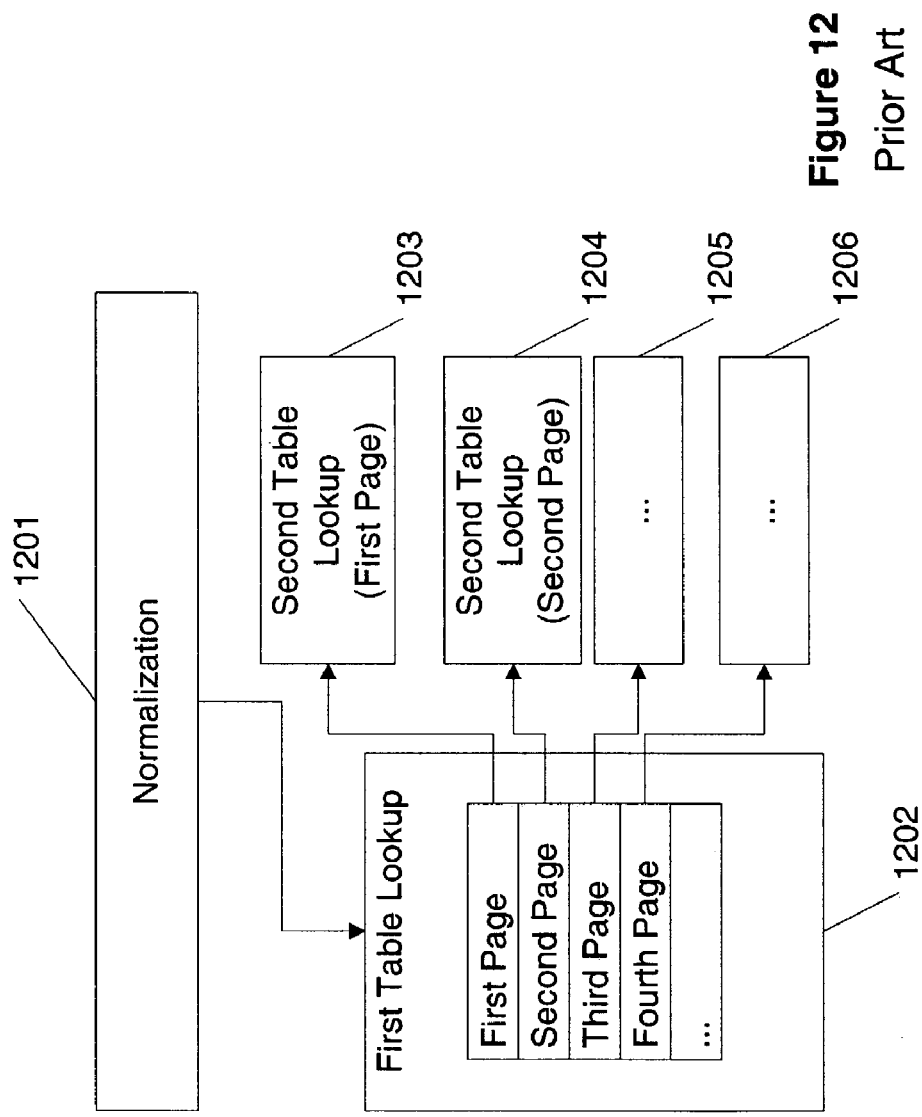
FIG. 12 shows a conventional two-table lookup process.

As described in FIG. 9, conventional Unicode normalization techniques attempt to look up characters via a two-table lookup. The conventional approach uses reoccurrences of character sequences. This two-table lookup costs time and uses up memory.

Aspects of the present invention provide an improved way to speed the lookup while eliminating the need to perform a second table lookup in some instances. Each cell may be kept small (for example, one byte or so). The resulting quick skip lookup table as shown in FIG. 3A (table 303) and FIG. 5 (table 502) may have a size dependent on the number of cells and the size of each cell. In one example, the size of the quick look up table may be 1536 bytes. Further, the following alone and/or in combination help prevent the need for a second table look up in some cases:

a. If none of the characters combines with other characters, the entire page may be marked as non-combinable and the second table lookup is avoided. For example, a page of Chinese characters would be marked as non-combinable. As is known in the art, a page may be a block of characters. For example, the page may range in size. For instance, the page may be defined as 64, 128, 256 or more characters.

b. Pages may be marked or flagged when they can be skipped initially. This provides the benefit of not needing the second table lookup unless they are followed by a character that could combine with them. These then don't need the 2nd lookup unless they are followed by a character that may be combined with them. For example, one such character is """.

c. Pages may also be flagged if all of the characters change to other characters. In some normalization forms this is common.

d. Pages may also be flagged if all of the characters are illegal.

e. Pages may also be flagged if special processing is required for that page of characters.

These various approaches permit pages to be marked and later skipped, thereby not needing the second table lookup.

Compressed Classes and the Use of Flags

In some situations, a second table lookup is needed. An additional issue exists that a lot of information may be needed to properly handle the second table lookup. Minimization of the storage space is desired. For example, one may only want to use one byte of space. A number of flags may be associated with the characters that one wants to process. These flags may be single bit flags. As known in the art, some of the flags relate to the "combining class" to which the character belongs. The combining class is a number from 0 to 240. The following may be used in alone or in combination with other processes to handle the combining classes.

The combining classes designator may be compressed into the range of 0-55 by removing unused values. This allows 2 additional bits for flags as the 56 combining classes may be expressed in 6 bits ($2^6$). In addition, special cases may be specified by unused values. For example, one may consider class 63 as a special class. Further, this space provides the ability to track 12 properties about the characters in addition to the class of the characters. For example, class 61 (or any other non-reserved class) may be used for Hangul characters The origin of the 0-55 classes is as follows: There are 54 currently assigned Unicode classes with values from 0 to 240. Two extra classes 221 and 231 (or any class designation) may be added to the original list of Unicode classes as described below. So the numbers from 0 to 55 may be used to describe all of the Unicode classes. For instance, Unicode class 0 is mapped to class 0, Unicode class 1 is mapped to class 1, the next Unicode class is 7, which is mapped to class 2, and so on until Unicode class 240 which is mapped to class 55.

Without compressing the class ranges, one would need at least an entire byte to store the class information, which would allow no extra room for my flags, and thereby effectively doubling the size of the data. By compressing the class sizes, along with other techniques, such as the late-normalization and choice of character properties and flags, one may keep the data per character low (for example, to 1 byte).

Assigning Classes to Base Characters

As mentioned above, Unicode characters have "combining classes" that help describe how combinable parts interact with each other. For example, a character such as ° has a class (° is class 230). The Unicode specification specifies that lower classes must come first. For example, "˛" (combining dot below, class 220) should appear before ° (combining ring, class 230). This becomes complicated when the input sequence is something like Å+˛ because the normalized form should be °+° instead. The conventional recommended method is to decompose the string to its parts A+°+˛ and then reorder it as A+˛+° and then combine the forms to A+°, which is an involved and slow process. To address this issue, the following may be used alone or in combination:

a. A class is assigned to the initial value (such as the angstrom symbol is assigned to class 230). Normally, the angstrom symbol "Å" would be considered class 0 because it could be its own character (whereas something like ° is a combining character meant to be attached to another character). This permits one to quickly examine Å and skip it. One can then quickly determine if the following character (here, class 220 for combining the dot below "˛") is a lower class and therefore if the higher class (here, Å with class 230) is out of order or if it may remain untouched. This may save several time consuming operations over the process shown by the conventional approach.

b. Next, one differentiates between the character with assigned the new class (here, Å) that could be its own complete character (which would have had class 0) and the character (here, °) that may have been combined to make the character. Some of the flags provided by compressing the classes allow this ability. So, for example, either one or both of the remaining two bits from above may be used to specify that character with a non-zero class (here, Å) is really a combined character and may be separated into two or more characters.

Complicated Characters

As mentioned above, the Unicode standard for composed normalization forms expects an implementation to expand a string to its fully decomposed form, and then to recompose it to its smallest form. This requires extra storage space and two or three passes on the string, which is undesirable. Aspects of the present invention attempt to use a single pass where possible. While faster, various complicated characters may be encountered. Most of those complicated characters may be resolved by the techniques described above. However, some characters exist that cannot be addressed by assigning base classes to the characters. For example, these may take the form of a base character and 2 combining characters of different classes. These characters may also have the characteristic that another combining character may be inserted between the 2 original combining characters in their fully composed normalized form. This may be resolved by the following:

a. Two placeholder classes may be created between existing Unicode classes. These placeholder classes allow the combining characters to sort in their correct order so that they can be quickly skipped if possible. If not easily ignored, those placeholder classes serve as a flag that special handling is necessary for those characters.

Flags

The following sets forth a list of illustrative flags that may be used to handle Unicode normalization. The following uses sets of flags in a main index table (the blocks of 128 code points) that later refers to the secondary lookup tables.

The first set of flags may be used in this main index table. To look the data up in the main index table, one divides the character's code point by 128. Other values may be used. However, 128 works well considering the Unicode table sizes.

byte bPageOrFlag=mainindex[character/128];

Next, bPageOrFlag may either be an index into the correct page of the more detailed table or one of the following flags:

// Constants used for reading paging tables
const byte NORM_PAGE_NORMAL=0xf9;
const byte NORM_PAGE_INVALID=0xfa;
const byte NORM_PAGE_CHANGED=0xfb;
const byte NORM_PAGE_NORMAL_SURROGATE=0xfc;
const byte NORM_PAGE_SPECIAL_SURROGATE=0xfd;
const byte NORM_PAGE_HANGUL_JAMO=0xfe;
const byte NORM_PAGE_HANGUL_SYLLABLE=0xff;

If bPageOrFlag is an index into a more detailed table, then a further lookup may be performed:

byte bDetailed=detailedTable[bPageOrFlag][character % 128]
byte bflags=bDetailed & 0xC0; // 2 high bits are flags
byte bClass=bDetailed & 0x3F; // 6 low bits are character "class"

bFlags may now contain the detailed flags from the following list. If bClass is 0 or 63, then the flags will contain the special information from the 2nd list.

// Constants used to flag our character information
// These are or'ed with our character class number
const byte NORM_FLAG_NON_START=0x80;

const byte NORM_FLAG_NON_START_
       COMBINES_WITH_PREVIOUS=0xc0;
    const byte NORM_FLAG START_MAY
       DECOMPOSE=0x00;
    const byte NORM_FLAG_START_MAY_
       DECOMPOSE_AND_COMBINE=0x40;
    // Preassigned Special Character Values for class 0 or class
       63 characters:
    // These special values take the place of characters that
       would otherwise be class 0 or class 63
    const byte NORM_CHAR_START=0x0;
    const byte NORM_CHAR_START_MAY_
       COMBINE_NON_START=0x40;
    const byte NORM_CHAR
       START_MAY_COMBINE_NEXT=0x80;
    const byte NORM_CHAR
       START_MAY_COMBINE_PREVIOUS=0xc0;
    const byte NORM_CHAR_ILLEGAL=0xff;
    const byte NORM_CHAR_DIFFERENT=1xbf;
    Further, values 0xaf and 0xcf may be used to create additional flags. Further, if one chooses different flags/properties, one may use the extra information in other ways.

Further, starting with the flags from bPageOrFlag, if the value is not one of these flags, it's a page index to the more detailed table.

The following lists illustrative main table flags. It is appreciated that other flags may be used with or in place of the following:
        const byte NORM_PAGE_NORMAL
        NORM_PAGE_NORMAL indicates that there is nothing special about any of the 128 characters in this page. In other words, they are all "start" characters that cannot combine with any other character. Next, the following character is processed. This is common, for example, in the Chinese range of characters. For most normalization forms, unknown/undefined characters may receive this value.
        const byte NORM_PAGE_INVALID NORM_PAGE_INVALID indicates that the entire 128 character block is invalid (illegal characters). An example of this is the low surrogate range. Surrogates always come in pairs and a combination of a high surrogate followed by a low surrogate combine to provide the value of the actual Unicode character. If we see a high surrogate, then the next character is immediately read. Accordingly, a low surrogate by itself should never be encountered. If so, the low surrogate is considered an illegal character. In some experimental normalization forms there are other cases where entire blocks of characters are disallowed.
        const byte NORM_PAGE_CHANGED
        NORM_PAGE_CHANGED indicates that all 128 characters in the page change to different characters in this normalization form. The blocks of "compatibility characters" have this property in the KC and KD forms.
        const byte NORM_PAGE_NORMAL_SURROGATE
        NORM_PAGE_HIGH_SURROGATE indicates that all 128 characters in this range are high surrogate characters. This character needs to be combined with the following low surrogate character. Assuming the following character is a legal low surrogate, this flag also indicates that ALL resulting combinations of these 128 high surrogates plus any low surrogates are all "normal" characters. They are all start characters that cannot combine with other characters or change and are therefore already normalized. This is similar to the NORM_PAGE_NORMAL characters. Currently, all characters >=0x30000 will have high surrogates with this property. Note that special code should check for the characters xxFFFE and xxFFFF where xx is 01-10 because this would mean that they are illegal characters.
        const byte NORM_PAGE_SPECIAL_SURROGATE
        NORM_PAGE_SPECIAL_HIGH_SURROGATE indicates that all 128 characters in this range are high surrogate characters. Accordingly, one needs to combine this character with the next character, which should be a low surrogate. Assuming the resulting pair is a legal character, then the "SPECIAL" part of this flag means that the system will have to look up the resulting character in the main index again because it may have special properties. Most supplementary characters <0x30000 will have high surrogates with this property.
        const byte NORM_PAGE HANGUL_JAMO
        NORM_PAGE_HANGUL_JAMO indicates that this page is entirely precomposed Korean Hangul Jamo characters. If the normalization is form C or KC, these are treated as "normal" characters and they will stay the same. If the normalization form is form D or KD, then the algorithm provided by the Unicode specification may be used to separate the Hangul Jamo to 2-3 individual Hangul syllable characters.
        const byte NORM_PACE_HANGUL_SYLLABLE
        NORM_PAGE_HANGUL_SYLLABLE indicates that this is the page that contains the individual Korean Hangul syllables. One may determine if the character is a Hangul syllable, and, if not, the system looks the character up in the detailed table. For example, one may determine if a Hangul character is used by determining if, for instance, its value is greater than or equal to 0x1100 but less than or equal to 0x11f9. Of course, any other technique may be used to determine if Hangul Jamo or Hangul Syllable characters are used. For valid syllable characters, if it is form C or KC, then the system composes it using the algorithm provided in the Unicode specification, otherwise for forms D & KD this character will remain the same.

The following describes the detailed character information flags. If the "main" table doesn't have any of the flags mentioned above, then the character has detailed information that needs to be looked up. Examples follow:
        byte bdetailed=detailedTable[bPageOrFlag][character % 128]
        byte bflags=bDetailed & 0xC0; // 2 high bits are flags
        byte bClass=bDetailed & 0x3F; // 6 low bits are character "class"
    bFlags now contains the detailed flags from the following list starting with NORM_FLAG . . . If bClass is 0 or 63, then the flags will contain the special information from the second list that starts with NORM_CHAR . . .
    The following describes the detailed flags:
    The detailed flags are 0x00, 0x40, 0x80 and 0xC0. Of course, the actual value assigned to each is unimportant so long as the four of them use the two bits allocated for the flags.
        const byte NORM_FLAG_NON_START
        NORM_FLAG_NON_START indicates that the character is not a start character. The character's class (low 6 bits) are a value from 1-62 that indicates the order that the character appears next to other non-start characters. For non-start characters following a start character, they may be sorted with the lowest classes coming first. An example would be character "Combining Overline", 0x0305, for which there are no precomposed characters.
        const byte NORM_FLAG_NON_START_COM-
           BINES_WITH_PREVIOUS
        NORM_FLAG_NON_START_COMBINES_
    WITH_PREVIOUS indicates that this character is not a start character, but it could combine with the previous start character. Again, the low 6 bits will be the class of this character. An example would be dieresis or accent characters which could combine to characters such as "ö" or "ó".

const byte NORM_FLAG_START_MAY_DECOMPOSE

NORM_FLAG_START_MAY_DECOMPOSE indicates that this character is a start character, but it might need to be decomposed. In form D or KD this character will decompose. The low 6 bits are the class of this first non-start character after the base character if this character were decomposed. In form C or KC, this character will decompose if there exists a following non-start character that would be a better combination for this base character. Ü is an example of this kind of character. It may decompose to U++. In addition the sequence Ü+ʟ would change to ʊ++ because the ʟhas a lower class than the or .

const byte NORM_FLAG_START_MAY_DECOMPOSE_AND COMBINE

NORM_FLAG_START_MAY_DECOMPOSE_AND_COMBINE is similar to the previous character. It is a start character that may decompose, however in forms C or KC it may also combine with a following non-spacing character. An example would be Ü, which could decompose to U+, combine with to make Ü or change from Ü+ʟ to ʊ+. Again the low 6 bits will be the class of the lowest class combining mark.

The following addresses special detail values:

If the "class" of the character is 0 or 63, then that class may not be used directly. Rather, one may check fort special values of bDetailed. The value of each flag is unimportant as long as the flags have a class of 0 or 63 (in which case the flags have the values of: 0x00, 0x40, 0x80, 0xc0, 0x3f, 0x7f, 0xbf or 0xff). Two more flags may still be used (only 6 of 8 flags have been used so far). Further, if needed, one may use classes below 63 as well.

const byte NORM_CHAR_START

NORM_CHAR_START describes a character that is a start character that cannot combine or decompose. It is left alone. An example would be the letter Q, which has no precomposed forms. (There is no Q+, for example.)

const byte NORM_CHAR_START_MAY_COMBINE_NON_START

NORM_CHAR_START_MAY_COMBINE_NON_START describes a character that can combine with a following non-start character. An example would be U, so U+could become Ü. In forms D or KD this may be treated the same as NORM_CHAR_START because those forms don't allow compositions.

const byte NORM_CHAR_START_MAY_COMBINE_NEXT

NORM_CHAR_START_MAY_COMBINE_NEXT describes characters that may combine with the next character whether it is a start or a non-start character. There are a few such characters, such as the Bengali Vowel Sign E (0x09C7), which can combine with the Bengali Vowel Sign AA (0x9BE) to create the character Bengali Vowel Sign O (0x9CB). Some of these characters may also combine with non-start characters.

const byte NORM_CHAR_START_MAY_COMBINE_PREVIOUS

NORM_CHAR_START_MAY_COMBINE_PREVIOUS describes characters that could combine with previous start character. There are a few such characters, such as the Bengali Vowel Sign AA (0x9BE), which can combine with a previous Bengali Vowel Sign E (0x09C7), to create the character Bengali Vowel Sign O (0x9CB). None of these characters combine with any following character.

const byte NORM_CHAR_ILLEGAL

NORM_CHAR_ILLEGAL describes characters that are illegal. 0xFFFF and 0xFFFE are examples of such characters.

const byte NORM_CHAR_DIFFERENT

NORM_CHAR_DIFFERENT describes a character that is different in this normalization form. In KC and KD, this includes all the compatibility characters. In C & D this includes a few characters such as Angstrom, which has been deprecated to A-ring (Å).

The following relates to start character classes discussed above:

In the Unicode standard, classes are assigned to non-start characters. Those classes help describe the common characteristics of the non-start character. For example, all Latin diacritics like +that appear above the character have class 230. All Latin diacritics that appear below the character, such as "ʟ", for instance, have class 220. This leads to the assumption that a class 220 diacritic and a class 230 diacritic will not interfere with each other. However, two class 230 diacritics may interfere with each other. The order of the non-spacing characters within the same class may also be important, in that those appearing first in the data stream appear closest to the base character.

Because characters of different classes don't interact with each other, one may reorder the characters so that they are ordered from lowest to highest class. For example, +ʟ+have the classes 230, 220 & 230 respectively. They would be reordered ʟ++so that the class 220 character appears first, and the 230 characters last. With respect to each other, the 230 characters retain their ordering.

Two additional classes may be used in data tables as follows: NORM_FLAG_START_MAY_DECOMPOSE or NORM_FLAG_START_MAY_DECOMPOSE_AND_COMBINE start character. This class represents the lowest class of the non-spacing characters that would be present if the start character were decomposed. This is helpful because, if following non-space characters have the same or higher class values, the system does not have to address decomposing the start character. If a following non-space character has a lower value, then the system then checks it because it may combine with the start character's base start character instead of the one currently combined with it. For example, Ü+ʟ is an example of this behavior that would change to ʊ++because the ʟhas a lower class than the or . In this case, ʟhas the class of 220 and and have the class of 230. The system then may assign the class 230 to the character Ü so that the system may easily tell that the ʟ's 220 is less than the Ü's 230 and may need some additional work to reorder the characters.

Most characters may be addressed as described above. However, there are a few characters with original classes 0 216 230 (0 is the class of the base start character) that may change to a composed character with classes 0 216 220. Further, there is an additional case where a class 0 230 240 character could change to a 0 230 230 240 character. To resolve these conflicts, artificial classes 221 and 231 may be used. Of course, any non-reserved class designation may be used.

When the system encounters a start character with the class 231 assigned to it, which is followed by a class 230 character, then special case handling will occur since 230 is less than 231. The system may perform a check for the 231 class case, and, if so, the system may need to insert an additional class 230 character into the precomposed character. This happens in cases such as character 0x1FA7 (Greek Small Letter Omega With Dasia and Perispomeni and Ypogegrammeni). The Dasia and Perispomeni have class 230 and the Ypogegrammeni has class 240. So the composed character Omega (class 0 start)+Dasia (class 230)+Ypogegrammeni (class 240) followed by a Perispomeni (class 230) would have to be modified to a single composed character.

Similarly, if the system encounters the artificial class 221, then the system knows that the character really has classes 0 216 230 that could change to a character with classes 0 216 220 character, if followed by an appropriate class 220 character.

FIGS. 3A and 3B show a process combining the various aspects described above. More specific treatment of the described sections is detailed in FIGS. 4-7. In step 301, a character is examined. In step 302, the system determines whether the character from step 301 is a low Unicode character (for example, for normalization form C, low Unicode values below 0x300 hexadecimal may be used; for normalization form D, values below 0x100 hexadecimal may be used; for normalization forms KC and KD, values below 1xA0 hexadecimal may be used). These characters are not combined with others. If the character from step 301 is a low ANSI character, the next character is examined. If no, then the process proceeds to step 303.

In step 303, the system looks up the status of the flags to see if a group of characters may be skipped. For example, the group may be referred to as a page whose length is 128 characters long. It is appreciated that any size page may be used. If the flags are determined in step 304 to be set so that the second table look up may be avoided, then the system processes the page in accordance with the flag or flags. If no, then the system determines if the character is a special case in step 305. If yes, then the system handles the character as a special case. Otherwise, the system attempts to look up the value of the character in the complete look up table in step 306.

If the system determines in step 307 that the value of the character from step 306 is a base character, then the system steps to examine the next character. If no, then the system performs a full normalization in step 308.

FIG. 3B shows the full normalization process of step 308. In step 309, the system attempts to start normalizing from the last base character. In step 310, the system looks up the base character's special properties, if any. For example, if the base character combines with non-base characters in a special order or in a special way.

Next, in step 311, the system determines if there is any character or characters between the current character and the base character that has a higher class than the current character. If yes, then the system places the characters in order in step 312 and moves to step 313. Otherwise, the system moves to step 313.

In step 313, the system determines if there are any non-combinable characters between the current character and the base character. If yes, the system moves to step 315 and proceeds to the next character. If no, then the system attempts to combine the current character and the base character in step 314. Next, the system moves to step 315.

Optionally, the system may perform step 316, in which special cases from step 310 are handled. Here, normalization is performed and/or character information is remembered for future processing. Finally, the system moves to the next character in step 315.

Using the above steps of FIGS. 3A and 3B, the following example is provided for the normalization of "A" and "°". In step 301, character "A" is examined. In step 302, "A" is not one of the low Unicode characters. In step 303, the system looks up "A" in the quick lookup table. As "A" is in the quick lookup table, the system skips to the next character in step 304. In step 301, the ring "°" is examined. The ring "°" character proceeds through steps 302-307. Next, in step 308, full processing is performed on the ring "°".

In step 309 from FIG. 3B, the system starts with the last base character (in this case "A"). This may be known from the fact that base characters were skipped in step 304. In step 310, the system looks up the special characters for "A" (so if the string was A+°+ Combining dot below, the system would only have to process the set of strings once). Next, in steps 311 and 312, the system ensures that lower classes come before higher classes. After sorting in steps 311 and 312, the system checks to be sure there are no non-combinable characters between "A" and "°". In step 314, the system attempts to combine "A" and "°". If "A" had any special case information, this information may be retained in step 316 (for example, the combination of A+°+ Combining Dot Below) so that, if another character was encountered (for instance, the Combining Dot Below), the system would be able to handle this instance without walking through the entire process again.

Figure 4:
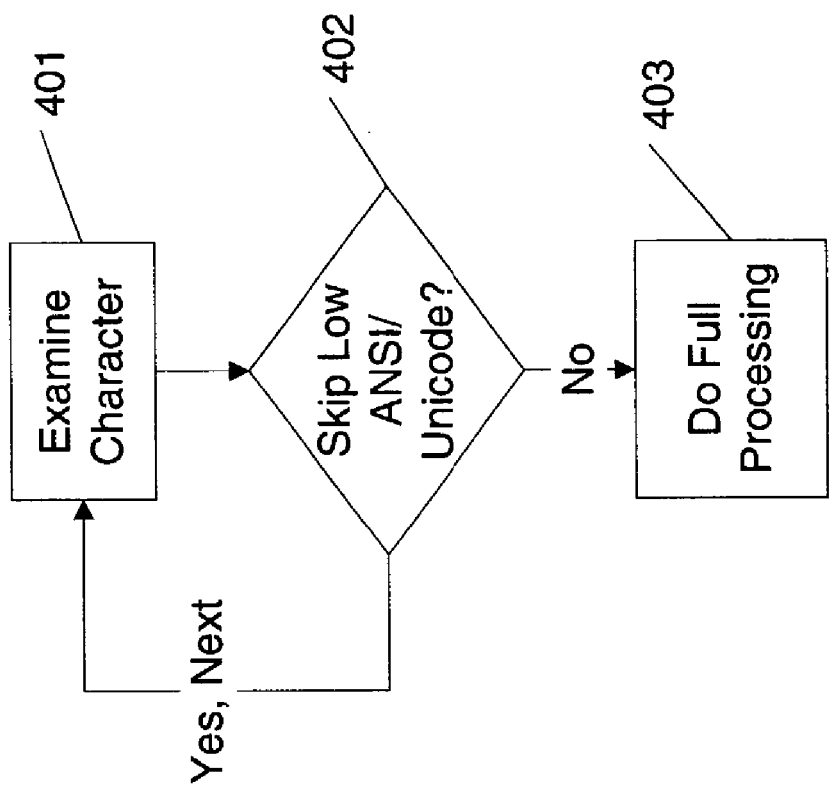
FIG. 4 shows a process for skipping low Unicode values in accordance with embodiments of the present invention.

FIGS. 4-7 show the various steps of FIG. 3A as separate processes. In FIG. 4, the character is examined in step 401. If the character is a low ANSI/Unicode character as determined in step 402, then the system steps to the next character and examines it in step 401. If not a low ANSI/Unicode character, the system performs full processing of the character in step 403.

Figure 5:
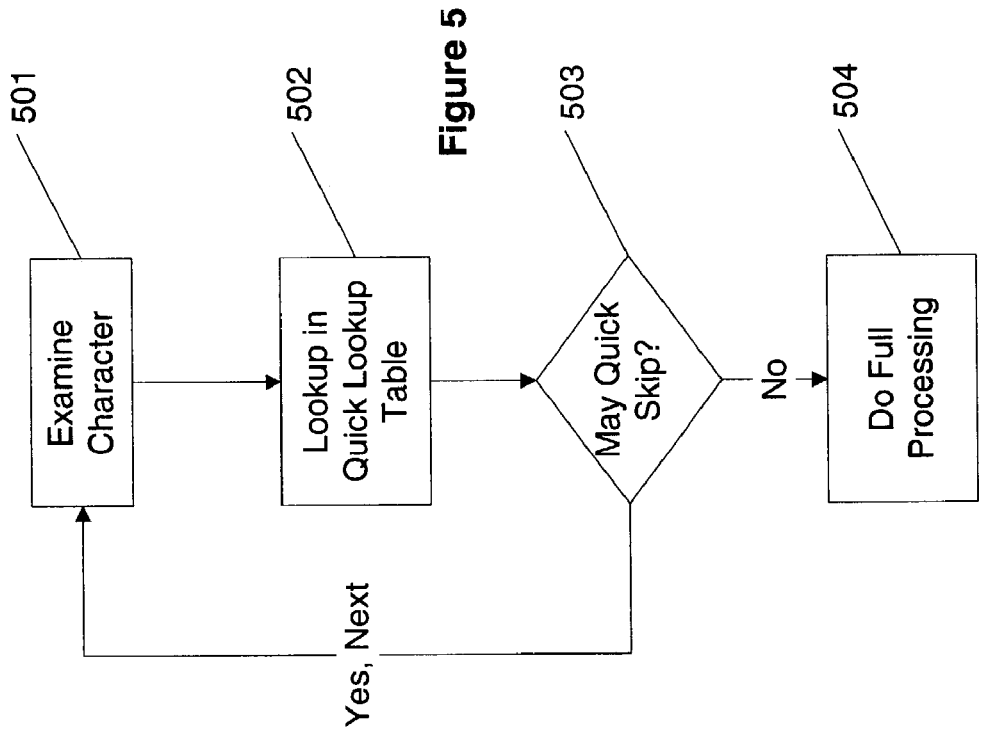
FIG. 5 shows a process for performing quick lookups in accordance with embodiments of the present invention.

FIG. 5 shows a process for looking up flags in a quick lookup table. In step 501, a character is examined. In step 502, the system determines whether the character has flags set. In step 503, the system determines if it may be skipped. If it cannot be skipped, full processing is performed in step 504.

Figure 6:
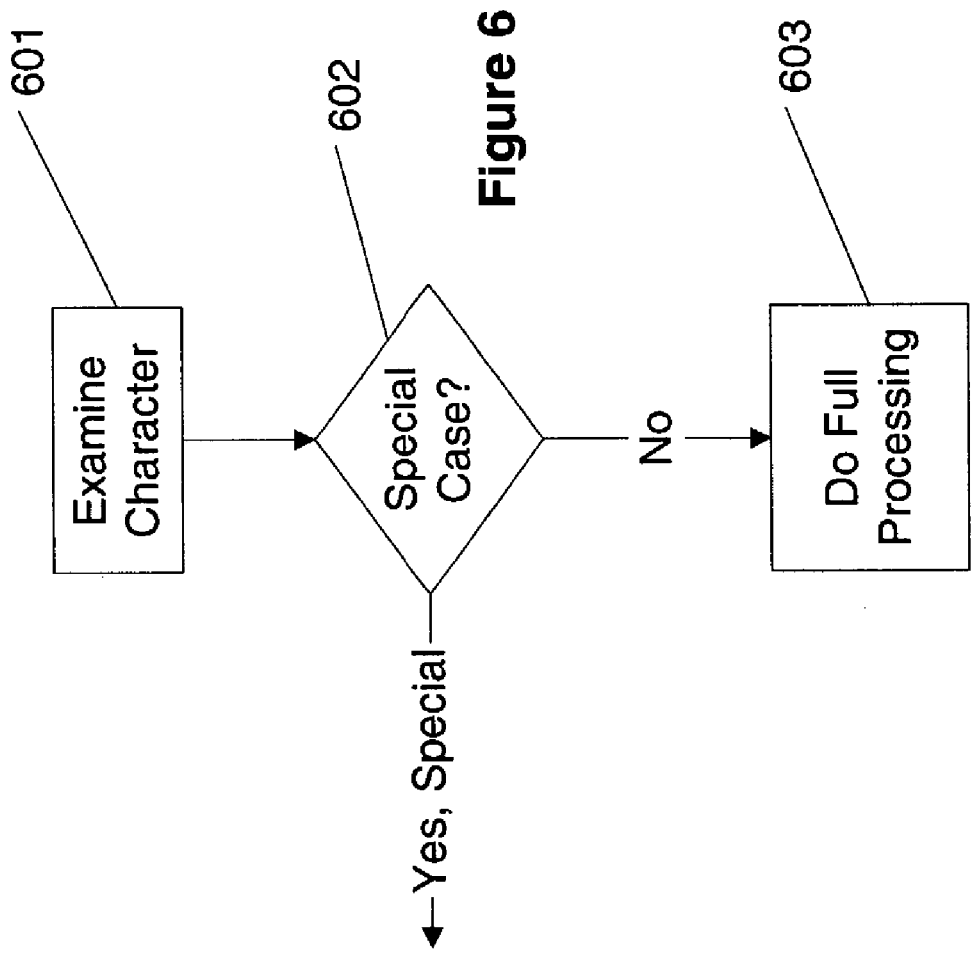
FIG. 6 shows a process for determining if special handing is needed in accordance with embodiments of the present invention.

FIG. 6 shows a process for handling special cases that would not normally be addressed. In step 601, a character is examined. In step 602, the system determines whether the character and any other related character (for example, preceding character or characters) are a special case. If yes, then the system moves to handle the special characters, otherwise, it moves to perform full normalization on the characters in step 603.

FIG. 7 shows a process for looking up values of characters and skipping if they are base characters. In step 701, the system examines a character. In step 702, the system looks up the value of the character in the complete look up table. In step 703, the system determines if the value of the character is a base character. If so, then it skips to the next character. Otherwise, it performs full processing on the character and related characters in step 704.

Although the invention has been defined using the appended claims, these claims are illustrative in that the invention is intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

I claim:

1. A computer-implemented process for normalizing Unicode comprising the following steps:
    examining characters represented in a Unicode string;
    determining if each examined character is in a quick lookup table;
    normalizing each examined character with a previous character for each examined character not in the quick lookup table;
    for each examined character in the quick lookup table, skip examining the next character represented in the Unicode string; and
    for each examined character normalized with a previous character, outputting the normalized form to the computer output.

2. A computer-implemented process for normalizing Unicode comprising the following steps:
    for each character in a Unicode string;
    examining the character;
    skipping the examined character if the examined character is a low Unicode character;
    otherwise, looking up the examined character in a table and skipping the examined character if possible;
    otherwise, skipping the examined character if the examined character is one of special case characters or if the examined character is a base character;
    if the examined character has not been skipped, performing a full normalization on the examined character; and
    for each examined character that has undergone full normalization, outputting the normalized form to the computer output.

3. The computer-implemented process according to claim 2, wherein the step of performing a full normalization on the examined character further includes the steps of:
    looking up the special properties of a previous base character;
    ordering all characters between the examined character and the base character;
    skipping normalization if any of the characters between the examined character and the base character are non-combinable characters;
    if none of the characters between the examined character and the base character are non-combinable characters, attempting to combine the examined character with the base character.

4. The computer-implemented process according to claim 3, wherein the step of performing a full normalization on the examined character further includes the steps of:
    performing special case normalization for the examined character and the base character; and
    remembering character information for potential future processing.

5. The computer-implemented process according to claim 3, wherein the step of performing a full normalization on the examined character further includes the step of:
    remembering character information for potential future processing.

6. A computer readable medium having computer-implemented instructions stored thereon, said instructions for normalizing Unicode when executed by a processor, said instructions comprising the following steps:
    examining characters represented in Unicode string;
    determining if each examined character is in a quick lookup table;
    normalizing each examined character with a previous character for each examined character not in the quick lookup table;
    for each examined character in the quick lookup table, skip examining the next character represented in the Unicode string; and
    for each examined character normalized with a previous character, outputting the normalized form to the computer output.

7. A computer readable medium having computer-implemented instructions stored thereon, said instructions for normalizing Unicode when executed by a processor, said instructions comprising the following steps:
    for each character in a Unicode string;
    examining the examined character;
    skipping the examined character if the examined character is a low Unicode character;
    otherwise, looking up the examined character in a table and skipping the examined character if possible;
    otherwise, skipping the examined character if the examined character is one of special case characters or if the examined character is a base character;
    if the examined character has not been skipped, performing a full normalization on the examined character; and
    for each examined character that has undergone full normalization, outputting the normalized form to the computer output.

8. The computer readable medium according to claim 7, wherein the step of performing a full normalization on the examined character further includes the steps of:
    looking up the special properties of a previous base character;
    ordering all characters between the examined character and the base character;
    skipping normalization if any of the characters between the examined character and the base character are non-combinable characters;
    if none of the characters between the examined character and the base character are non-combinable characters, attempting to combine the examined character with the base character.

9. The computer readable medium according to claim 8, wherein the step of performing a full normalization on the examined character further includes the steps of:
    performing special case normalization for the examined character and the base character; and
    remembering character information for potential future processing.

10. The computer readable medium according to claim 8, wherein the step of performing a full normalization on the examined character further includes the step of:
    remembering character information for potential future processing.

11. A computer system for normalizing Unicode, said system comprising:
    an input for receiving characters;
    a processor for normalizing the characters, said processor performing the steps of:
        examining characters represented in a Unicode string;
        determining if each examined character is in a quick lookup table;

normalizing each examined character with a previous character for each examined character not in the quick lookup table; and for each examined character in the quick lookup table, skip examining the next character represented in the Unicode string;

an output for outputting a normalized form of the received characters.

12. A computer system for normalizing Unicode, said system comprising:

an input for receiving characters;

a processor for normalizing the characters, said processor performing the steps of:

for each character in a Unicode string;

examining the character;

skipping the examined character if the examined character is a low Unicode character;

otherwise, looking up the examined character in a table and skipping the examined character if possible;

otherwise, skipping the examined character if the examined character is one of special case characters or if the examined character is a base character;

if the examined character has not been skipped, performing a full normalization on the examined character;

an output for outputting a normalized form of said received characters.

13. The computer system according to claim 12, wherein the step of performing a full normalization on the examined character performed by the processor further includes the steps of:

looking up the special properties of a previous base character;

ordering all characters between the examined character and the base character;

skipping normalization if any of the characters between the examined character and the base character are non-combinable characters;

if none of the characters between the examined character and the base character are non-combinable characters, attempting to combine the examined character with the base character.

14. The computer system according to claim 13 wherein the step of performing a flail normalization on the examined character performed by the processor further includes the steps of:

performing special case normalization for the examined character and the base character; and remembering character information for potential future processing.

15. The computer system according to claim 13, wherein the step of performing a full normalization on the examined character performed by the processor further includes the step of:

remembering character information for potential future processing.

16. A computer system for normalizing Unicode comprising the following steps:

means for examining characters represented in a Unicode string;

means for determining if each examined character is in a quick lookup table;

means for normalizing each examined character with a previous character when the examined character is not in the quick lookup table;

means for skipping examining the next character represented in the Unicode string, when the examined character is in the quick lookup table; and means for outputting to the computer output the normalized form of an examined character with a previous character, when the examined character is not in the quick lookup table.

* * * * *